(12) United States Patent
Li et al.

(10) Patent No.: US 11,954,198 B2
(45) Date of Patent: Apr. 9, 2024

(54) UNIFYING HARDWARE TRUSTED EXECUTION ENVIRONMENT TECHNOLOGIES USING VIRTUAL SECURE ENCLAVE DEVICE

(71) Applicant: VMware, Inc., Palo Alto, CA (US)

(72) Inventors: Ye Li, Newton, MA (US); David Ott, Chandler, AZ (US); Cyprien Laplace, Boston, MA (US); Andrei Warkentin, North Andover, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 924 days.

(21) Appl. No.: 16/671,106

(22) Filed: Oct. 31, 2019

(65) Prior Publication Data

US 2021/0133315 A1    May 6, 2021

(51) Int. Cl.
*G06F 21/53* (2013.01)
*G06F 9/455* (2018.01)
*G06F 21/60* (2013.01)

(52) U.S. Cl.
CPC .......... *G06F 21/53* (2013.01); *G06F 9/45558* (2013.01); *G06F 21/604* (2013.01); *G06F 2009/45591* (2013.01); *G06F 2221/033* (2013.01)

(58) Field of Classification Search
CPC .... G06F 21/53; G06F 9/45558; G06F 21/604; G06F 2009/45591; G06F 2221/033
See application file for complete search history.

(56) References Cited

U.S. PATENT DOCUMENTS

| | | | | |
|---|---|---|---|---|
| 8,166,474 B1* | 4/2012 | Delco | ............... | G06F 9/45558 718/1 |
| 9,792,143 B1* | 10/2017 | Potlapally | ............ | G06F 21/6218 |
| 2014/0337983 A1* | 11/2014 | Kang | ...................... | G06F 21/78 726/26 |
| 2015/0347758 A1* | 12/2015 | Ang | ...................... | H04L 9/0822 713/189 |
| 2015/0347768 A1* | 12/2015 | Martin | ..................... | G06F 21/56 726/1 |
| 2016/0070932 A1* | 3/2016 | Zimmer | .................. | G06F 21/53 713/192 |
| 2016/0171248 A1* | 6/2016 | Nesher | .................... | G06F 21/53 713/190 |
| 2016/0191246 A1* | 6/2016 | Varadarajan | ............. | G09C 1/00 713/2 |

(Continued)

*Primary Examiner* — Saleh Najjar
*Assistant Examiner* — Devin E Almeida
(74) *Attorney, Agent, or Firm* — King Intellectual Asset Management (57) ABSTRACT

System and method for creating and managing trusted execution environments (TEEs) using different underlying hardware TEE mechanisms use a virtual secure enclave device which runs in a virtualized environment in a computer system. The device enables an enclave command transmitted to the virtual secure enclave device to be retrieved and parsed to extract an enclave operation to be executed. A TEE backend module is used to interact with a particular hardware TEE mechanism among those available in the computer system. The module ensures the enclave operation for the software process is executed by the particular hardware TEE mechanism, or the TEE scheme based on a particular hardware TEE mechanism.

16 Claims, 4 Drawing Sheets

(56) References Cited

U.S. PATENT DOCUMENTS

| | | | |
|---|---|---|---|
| 2016/0259731 A1* | 9/2016 | Evans | G06F 21/53 |
| 2017/0026181 A1* | 1/2017 | Chhabra | H04L 9/3234 |
| 2017/0091434 A1* | 3/2017 | Proulx | G06F 21/32 |
| 2018/0114013 A1* | 4/2018 | Sood | G06F 21/606 |
| 2018/0211034 A1* | 7/2018 | Costa | G06F 9/45558 |
| 2020/0167503 A1* | 5/2020 | Wei | G06F 21/602 |
| 2021/0019393 A1* | 1/2021 | Michalevsky | G06F 9/45545 |
| 2021/0303734 A1* | 9/2021 | Tsirkin | G06F 21/74 |
| 2022/0358220 A1* | 11/2022 | Smith | G06F 21/57 |

* cited by examiner

UNIFYING HARDWARE TRUSTED EXECUTION ENVIRONMENT TECHNOLOGIES USING VIRTUAL SECURE ENCLAVE DEVICE

BACKGROUND

Intel® Software Guard Extension (SGX) is a hardware technology that can be used to provide isolated application environments, or enclaves, for secure applications. The Intel SGX features isolated, encrypted memory regions for user-level application code and data. It ensures data confidentiality and code integrity even if the operating system is compromised. The SGX hardware provides attestation services to verify the authenticity of platforms and integrity of enclaves.

Intel SGX has been highly influential within the world of trusted execution environments (TEEs) in recent years, increasing interest in various use cases and programming models. Another trend has been the growing diversity of TEE hardware technologies and programming models. In addition to SGX, TEEs have been developed in both academia and industry using Arm TrustZone and RISC-V. Importantly, other TEE schemes have been developed which leverage hardware features not specifically designed for TEEs but usable as building blocks. Examples of such technologies include AMD Secure Encrypted Virtualization (SEV) and Intel Multi-Key Total Memory Encryption (MKTME), which provide hardware encrypted virtual machines (VMs) that remove the hypervisor from the chain of trust for VM/application owners.

While TEEs offer a promising new avenue for software security, hardware TEE technologies usually offer low level hardware interfaces for TEE management and configuration which are difficult to use by secure application developers directly. As a result, a growing number of TEE software development kits (SDKs) have emerged within the industry offering programming models that are easier to use by secure application developers. Examples of these SDKs include the Google Asylo and Microsoft Open Enclave. These SDKs are designed to support different TEE backends even though most of them currently have only SGX support. In addition, none of them offer solutions for a virtualized environment.

BRIEF DESCRIPTION OF THE DRAWINGS

Throughout the description, similar reference numbers may be used to identify similar elements.

DETAILED DESCRIPTION

Figure 1:
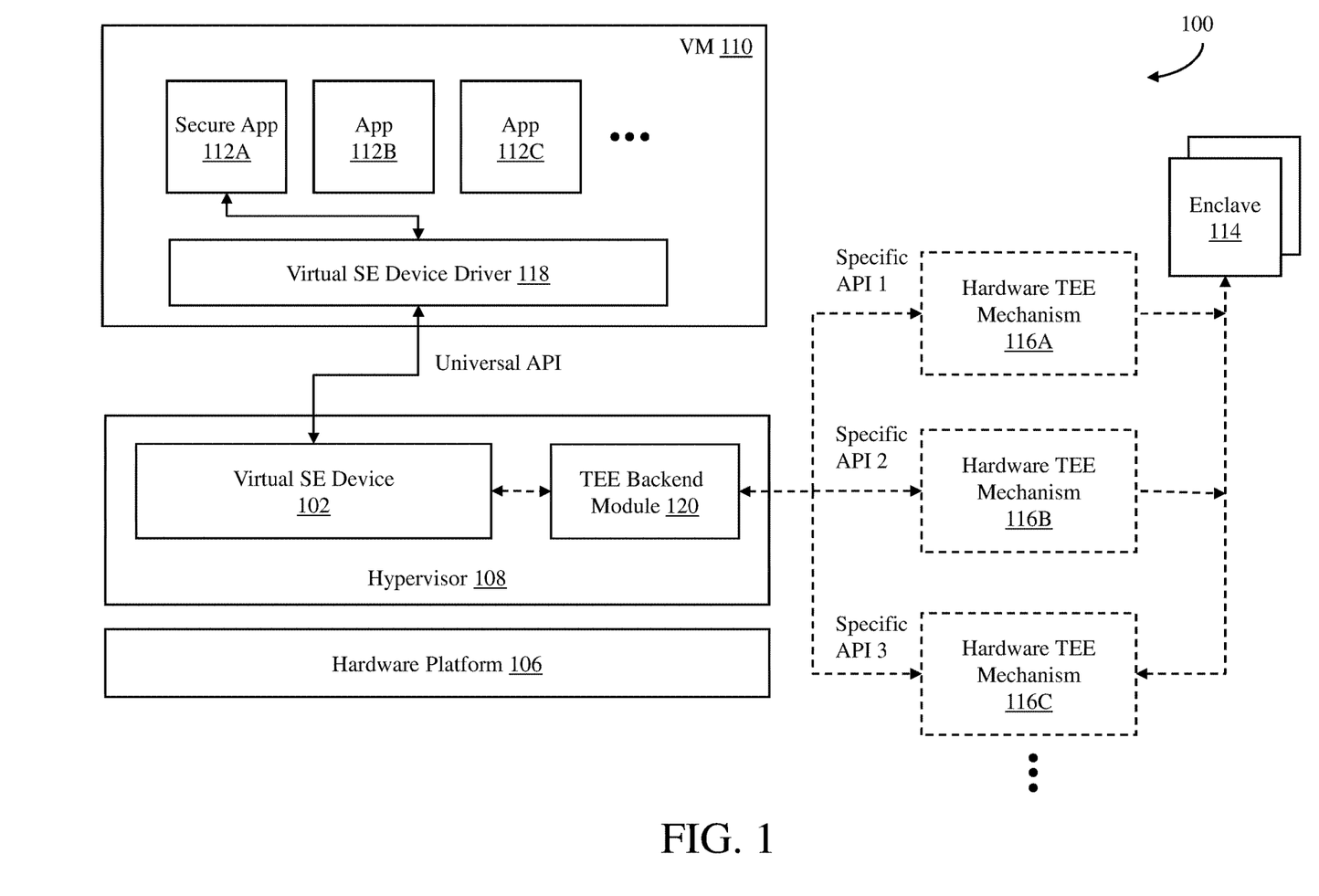
FIG. 1 is a block diagram of a system architecture that unifies different hardware trusted execution environment (TEE) technologies using a virtual secure enclave device in a virtualized environment in accordance with an embodiment of the invention.

FIG. 1 is a high-level view of a system architecture 100 in accordance with an embodiment of the invention that unifies different hardware trusted execution environment (TEE) technologies using a virtual secure enclave (SE) device 102 in a virtualized environment. This architecture allows software processes to use any hardware TEE mechanism available in the system. As described herein, the use of the virtual SE device 102 provides for easy discovery and configuration of TEE capabilities available in any computer system. Thus, the virtual SE device 102 provides a unified interface to use the available hardware TEE mechanism in any system, which simplifies SDK integration and avoids N SDKs to M hardware TEE technologies mappings. In addition, the use of the virtual SE device 102 allows for migration of software processes from a computer system with one hardware TEE mechanism to another computer system with a different hardware TEE mechanism.

As shown in FIG. 1, the system architecture 100 includes a physical hardware platform 106, which includes hardware components commonly found in a computer system, such as one or more central processing units (CPUs) and memory. A virtualization software 108, such as a hypervisor, runs on the physical hardware platform, to host or support a number of virtual computing instances (VCIs) 110. As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. A VM may be comprised of a set of specification and configuration files and is backed by the physical resources of a physical host computer. An example of such a VM is a VM created using VMware vSphere® solution made commercially available from VMware, Inc of Palo Alto, California A virtual container is a package that relies on virtual isolation to deploy and run applications that access a shared operating system (OS) kernel. An example of a virtual container is a virtual container created using a Docker engine made available by Docker, Inc. Although the virtualization software 108 may support different types of VCIs, the virtualization software 108 will be described herein as supporting VMs. Thus, in FIG. 1, the VCI 110 is illustrated as a VM.

The VM 110 will be used as a representative VCI to illustrate the inventive features of the invention. As shown in FIG. 1, the VM 110 includes a number of software applications 112 (e.g., applications 112A, 112B, 112C . . . ) running on a guest operating system (OS) (not shown in FIG. 1) of the VM. The software applications 112 can be any software programs, processes or routines running on the VM. Some of these applications 112 may need to protect sensitive content, such as codes and/or data. As used herein, codes of sensitive content may refer to computer codes that can execute software routines, and data of sensitive content may refer to any confidential information, such as encryption keys. As an example, one of the applications 112 shown in FIG. 1 is labeled as a secure application 112A, which may need to protect sensitive content in a trusted execution environment (TEE). This TEE for the secure application 112A will appear to be provided by the virtual SE device 102 in the hypervisor 108 in the form of one or more secure memory enclaves 114, as far as the secure application is concerned. However, as explained below, these secure memory enclaves 114 are actually provided by a hardware TEE mechanism of the system, as described below.

The VM 110 further includes a virtual SE device driver 118, which is used by the guest OS of the VM to communicate with the virtual SE drive 102. Thus, when any application running in the VM 110, such as the secure application 112A, requires the use of one or more secure memory enclaves, the guest OS on which the application is running can communicate with the virtual SE device 102 to execute various operations associated with the secure memory enclaves.

As illustrated in FIG. 1, the hardware TEE mechanism available for the system architecture 100 can be any one of many different types of hardware TEE mechanisms 116 (e.g., hardware TEE mechanisms 116A, 116B, 116C . . . ) that can provide secure memory enclaves. As an example, the hardware TEE mechanism available in the system may be the hardware TEE mechanism 116A, which may be Intel SGX hardware. As another example, the hardware TEE mechanism available in the system may be the hardware TEE mechanism 116B, which may be a secure enclave peripheral component interconnect (PCI) device, as described in a simultaneously filed U.S. patent application titled "System and Method for Implementing Trusted Execution Environment on PCI Device," which is assigned to the same applicant as this patent application and incorporated herein by reference. Thus, the hardware TEE mechanism available in a particular computer system can vary from one system to another.

Depending on the hardware TEE mechanism 116 available in the system architecture 100, the virtual SE device 102 will leverage that hardware TEE mechanism to provide secure memory enclaves to any software process running in the system, such as the secure application 112A. The virtual SE device 102 operates to interface with any software process with secure memory enclave needs to manage one or more secure memory enclaves, which can be, for example, created, configured, executed and removed. Thus, the secure application only needs to communicate with the virtual SE device 102 for any operations relating to secure memory enclaves. However, these operations with respect to secure memory enclaves are actually performed by the hardware TEE mechanism in the system. Thus, the secure applications do not have to follow the specific protocols, such as specific commands, required by the hardware TEE mechanism of the system to instruct the particular hardware TEE mechanism available in the system to perform various operations with respect to secure memory enclaves.

The interactions with the hardware TEE mechanism are executed by a TEE backend module 120 in the hypervisor 120. The TEE backend module uses the specific protocol for the particular hardware TEE mechanism available in the system to instruct the hardware TEE mechanism to execute various operations relating to secure memory enclaves in response to commands made to the virtual SE device 102. As illustrated in FIG. 1, if the hardware TEE mechanism included in the system is the hardware TEE mechanism 116A, then a specific application programming interface (API) 1 is used for communications between the TEE backend module 120 and the hardware TEE mechanism 116A. However, if the hardware TEE mechanism included in the system is the hardware TEE mechanism 116B, then a specific API 2 is used for communications between the TEE backend module 120 and the hardware TEE mechanism 116B. Similarly, if the hardware TEE mechanism included in the system is the hardware TEE mechanism 116B, then a specific API 3 is used for communications between the TEE backend module 120 and the hardware TEE mechanism 116C.

In contrast, as illustrated in FIG. 1, the interactions between the virtual SE device driver 118 and the virtual SE device 102 are executed using a common universal API, which is the same regardless of the hardware TEE mechanism included in the system. Thus, communications between the virtual SE device driver 118 and the virtual SE device 102 are executed using the same universal API for all the different types of hardware TEE mechanisms that can be available in the system. Thus, this universal API is an API that unifies all the different hardware TEE mechanisms that can found in computer systems.

One way to view this process is that the enclave operation commands issued to the virtual SE device 102 are achieved using the universal API. However, the enclave operation commands to the virtual SE device 102 are then translated to one of the specific APIs that depends on the hardware TEE mechanism included in the computer system. Thus, regardless of the hardware TEE mechanism included in the computer system, the enclave operation commands issued to the virtual SE device 102 from the secure applications are the same. However, the enclave operation commands issued to the hardware TEE mechanism by the TEE backend module 120 are specific to the hardware TEE mechanism included in the computer system. If the computer system had a different hardware TEE mechanism, then the enclave operation commands issued to the hardware TEE mechanism by the TEE backend module 120 would be different and specific to that hardware TEE mechanism.

This process allows software development kits (SDKs) to focus on the interface to the virtual SE device 102 without having to worry about the hardware TEE mechanism included in the computer system. Thus, each SKD would require a mapping to a single device, rather than mapping to multiple hardware TEE mechanisms. Therefore, the system architecture 100 avoids the N SDKs to M TEE technologies mappings.

Another advantage of the system architecture 100 is that the VCIs, e.g., VMs, can be migrated between host computer systems with different hardware TEE mechanisms and the applications running in the migrated VMs will be able to use the hardware TEE capabilities of the destination computer systems. In conventional systems, when a VM is migrated from a source host computer system with one type of hardware TEE mechanism to a destination host computer system with another type of hardware TEE mechanism, the applications running in the migrated VM may not be able to use the hardware TEE capabilities of the destination computer system because the API used in the source host computer is not the same API needed in the destination host computer. However, using the system architecture 100, the API used to communicate with the virtual SE device 102 in the source host computer system will be the same API used to communicate with the virtual SE device in the destination host computer system. Thus, VM can be migrated between host computer systems with different hardware TEE mechanisms without any issues of whether the applications running in the migrated VM can use the hardware TEE capabilities of the destination computer systems.

Figure 2:
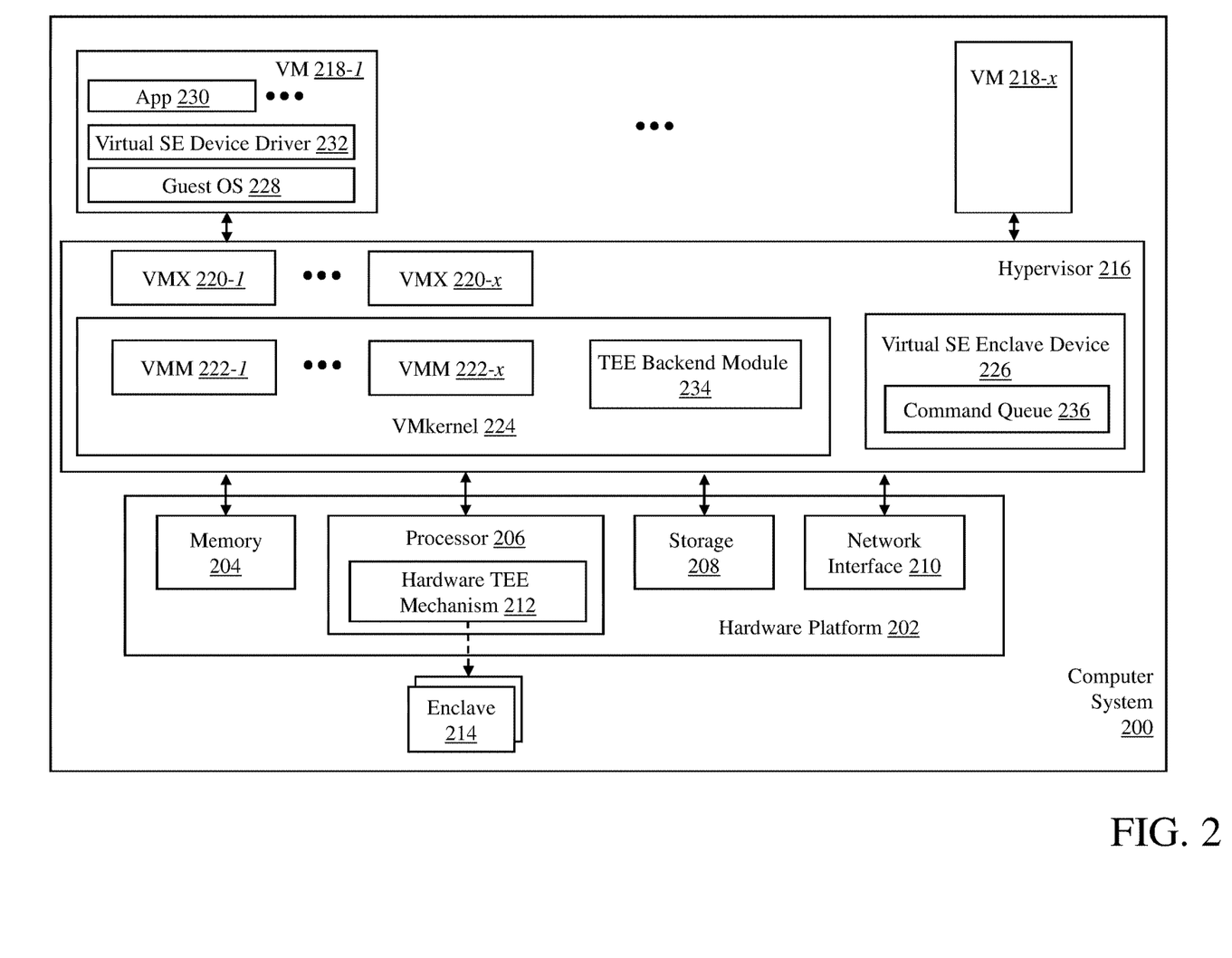
FIG. 2 is a block diagram of a computer system with a virtual secure enclave device in accordance with an embodiment of the invention.

Turning now to FIG. 2, a computer system 200 in accordance with an embodiment of the invention is shown. The computer system 200 implements that the system architecture 100 described above to manage secure memory enclaves regardless of the hardware TEE mechanism available in the system.

The computer system 200 includes a physical hardware platform 202, which includes at least one or more system memories 204, one or more processors 206, a storage 208, and a network interface 210. Each system memory 204, which may be random access memory (RAM), is the volatile memory of the computer system 200. Each processor 206 can be any type of a processor, such as a central processing unit (CPU) commonly found in a server computer. In the illustrated embodiment, the processor 206 includes a hardware TEE mechanism 212, for example, Intel® SGX mechanism. The hardware TEE mechanism 212 provides secure memory enclaves 214, which can be used by software processes running in the computer system 200. The storage 208 can be any type of non-volatile computer storage with one or more storage devices, such as a solid-state devices (SSDs) and hard disks. Although the storage 208 is shown in FIG. 2 as being a local storage, in other embodiments, the storage 208 may be a remote storage, such as a network-attached storage (NAS). The network interface 210 is any interface that allows the computer system 200 to communicate with other devices through one or more computer networks. As an example, the network interface 210 may be a network interface controller (NIC).

The computer system 200 further includes a virtualization software 216 running directly on the hardware platform 202 or on an operation system (OS) of the computer system 200. The virtualization software 216 can support one or more VCIs. In addition, the virtualization software 216 can deploy or create VCIs on demand. In the illustrated embodiment, the virtualization software 216 is a hypervisor, which enables sharing of the hardware resources of the computer system 200 by VCIs in the form of VMs that are hosted by the hypervisor. One example of a hypervisor that may be used in an embodiment described herein is a VMware ESXi™ hypervisor provided as part of the VMware vSphere® solution made commercially available from VMware, Inc. of Palo Alto, California.

The hypervisor 216 provides a device driver layer configured to map physical resources of the hardware platform 202 to "virtual" resources of each VM supported by the hypervisor such that each VM has its own corresponding virtual hardware platform. Each such virtual hardware platform provides emulated or virtualized hardware (e.g., memory, processor, storage, network interface, etc.) that may, for example, function as an equivalent, conventional hardware architecture for its corresponding VM.

In FIG. 2, the computer system 200 is shown to include a number of VMs 218-1 to 218-x supported by the hypervisor 216. Each of these VMs has a virtual hardware platform, which is an emulation of the physical hardware platform that has been allocated to that VM. Thus, each virtual hardware platform includes at least emulated memory, emulated processor, virtual storage and virtual network interface, which correspond to the memory 204, the processor 206, the storage 208 and the network interface 210, respectively, of the hardware platform 202 of the computer system 200. The virtual hardware platform for each of the VMs is provided by a virtual machine executable (VMX) module 220-i and a virtual machine monitor (VMM) 222-i for that VM in the hypervisor 216. Thus, there are same number of VMX module 220-1 to 220-x and same number of VMMs 222-1 to 222-x as the VMs 218-1 to 218-x.

In an embodiment, the VMMs 222-1 to 222-x run in a VMkernel 224 of the hypervisor 216. The VMkernel is a Portable Operating System Interface (POSIX) like operating system. The VMkernel is the liaison between the VMs 218-1 to 218-x and the physical hardware that supports them. The VMkernel runs on bare metal and is responsible for allocating memory, scheduling CPUs and providing other hardware abstraction and OS services.

For each VM 218-i, the associated VMM 222-i and VMX module 220-i for that VM operate to emulate the hardware resources of the computer system 200 for that VM. In addition to the emulation of the computer hardware resources for a VM, each VMX module is responsible for handling input/output (I/O) to devices that are not critical to performance. The VMX module is also responsible for communicating with user interfaces and other modules. Each VMM is responsible for virtualizing the guest OS instructions from the VM and the management of memory. In addition, the VMM operates to pass storage and network I/O requests to the VMkernel 224, and to pass all other requests to the VMX module. As described below, the VMM and VMX module for each VM may also assist in the transmission of enclave commands between the hardware TEE mechanism 212 and a virtual SE device 226, which is running in a virtualized environment provided by the hypervisor 216. The virtual SE device 226 will be described further below.

With the support of the hypervisor 216, the VMs 218-1 to 218-x provide isolated execution spaces for guest software. Each VM includes a guest operating system 228, and one or more guest applications 230, some of which may be secure applications that use secure memory enclaves 214 created by the hardware TEE mechanism 212 via the virtual SE device 226. The guest OS 228 manages virtual hardware resources made available to the corresponding VM by the hypervisor 216, and, among other things, the guest OS forms a software platform on top of which the guest applications 230 run. Each VM may also include a virtual SE device driver 232 to communicate with the virtual SE device 226.

The computer system 200 with the deployed VMs 218-1 to 218-x may have various software processes running in the computer system. As an example, one or more software processes may be running on the host OS of the computer system 200, one or more software processes may be running on the guest OSs 228 of the VMs as guest applications 230, and one or more software processes may be running in the hypervisor 216. Any of these software processes may use secure memory enclaves provided by the hardware TEE mechanism 212 via the virtual SE device 226, as described below.

Similar to the virtual SE device 132 shown in FIG. 1, the virtual SE device 226 operates to interface with software processes, such as the applications 230 running in the VMs 218-1 to 218-x, to manage the secure memory enclaves 214, which can be, for example, created, configured, executed and removed. Thus, the software processes only need to communicate with the virtual SE device 226 for any operations relating to secure memory enclaves. However, these operations with respect to secure memory enclaves are actually performed by the hardware TEE mechanism 212 of the computer system 200. Thus, the software processes do not have to follow the specific protocols required by the hardware TEE mechanism 212 of the computer system 200 to instruct the hardware TEE mechanism to perform various operations with respect to secure memory enclaves. The interactions with the hardware TEE mechanism 212 are executed by a TEE backend module 234. In an embodiment, enclave operation commands issued to the virtual SE device 236 from a software process, such as one of the guest applications 230, via the virtual SE device driver 232 using the universal API are be viewed as being translated by the TEE backend module 234 to enclave operation commands to the hardware TEE mechanism 212 in the computer system 200 using the API specific to the hardware TEE mechanism 212. These translated enclave operation commands are then issued to the hardware TEE mechanism 212 so that the hardware TEE mechanism can execute the requested enclave operations.

In the illustrated embodiment, the virtual SE device 226 includes a command queue 236 that can store enclave commands issued by software processes in the computer system 200, such as the guest applications 230 running in the VMs 218-1 to 218-x. The command queue 236 is exposed to the secure applications 230 so that the secure applications can send enclave commands to the command queue 236 of the virtual SE device 226 through the virtual SE device driver 232.

In an embodiment, when a new enclave command is added to the command queue 236 of the virtual SE device 226 from a guest application 230 running in the VM 218-i, the VMM 220-i associated with that VM is notified of the new enclave command. In response to the notification, a request is made by the VMM to the VMX module 222-i associated with that VM for emulation of the command queue 236 in the virtual SE device 226. In response to this request, the command queue 236 in the virtual SE device 226, including all the new or outstanding enclave commands, is emulated by the VMX module. As part of this emulation process, the new enclave commands are retrieved by the VMX module. In addition, the new enclave commands are parsed by the VMX module to extract information contained in the new enclave commands, such as descriptions of enclave operations included in the enclave commands. In the illustrated embodiment, the emulation of the command queue 236 in the virtual SE device 226 is performed within the VMkernel 224, which may have performance advantages. However, in other embodiments, the emulation of the command queue 236 in the virtual SE device 226 may be performed elsewhere in the hypervisor 216.

Based on the information contained in the new enclave commands, services corresponding to the new enclave commands are requested from the TEE backend module 234 by the VMX module 220-i. In an embodiment, these services requests may be made using system calls to the TEE backend module 234 inside the VMkernel 224. In response to these service requests, the hardware TEE mechanism 212 is engaged by the TEE backend module 234 to fulfill the requested services or operations. In an embodiment, this engagement or interaction may involve issuing appropriate enclave commands for the requested services to the hardware TEE mechanism 212, which would cause the hardware TEE mechanism to execute the requested services or operations, such as enclave creation, enclave configuration, enclave execution and enclave removal operations. Thus, the applications 230 that are issuing the enclave commands do not have to conform to any requirements of the hardware TEE mechanism 212 of the computer system 200, which may vary from one computer system to another computer system depending on the hardware TEE capabilities of the systems.

Figure 3:
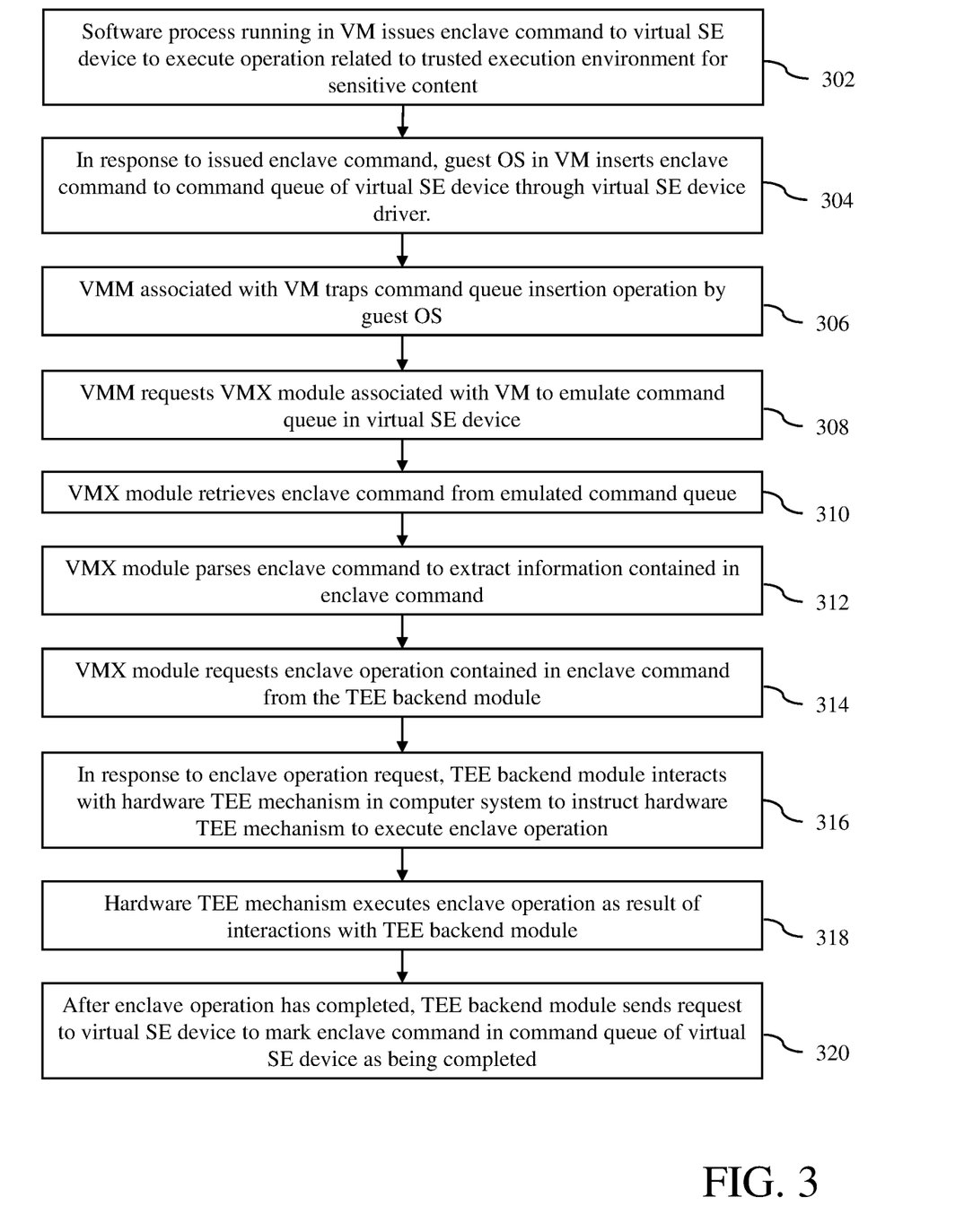
FIG. 3 is a process flow diagram of an enclave management process in the computer system shown in FIG. 2 in accordance with an embodiment of the invention.

An enclave management process in the computer system 200 in accordance with an embodiment of the invention is now described with reference to a process flow diagram of FIG. 3. The process begins at step 302, where a software process, such as one of the applications 230, running in a VM 218-i issues an enclave command to the virtual SE device 226 to execute an operation related to a trusted execution environment for sensitive content. Next, at step 304, in response to the issued enclave command, the guest OS in the VM inserts the enclave command to the command queue 236 of the virtual SE device 226 through the virtual SE device driver 232.

At step 306, the VMM 222-i associated with the VM 218-i traps the command queue insertion operation by the guest OS 228 running in that VM. Next, at step 308, the VMM 222-i requests the VMX module 220-i associated with the VM 218-1 to emulate the command queue 236 in the virtual SE device 226, including the issued enclave command. Next, at step 310, the VMX module 220-i retrieves the enclave command from the emulated command queue. Next, at step 312, the VMX module 220-i parses the enclave command to extract information contained in the enclave command. The extracted information may include a description of an enclave operation that is requested, such as an enclave creation operation, an enclave configuration operation, an enclave execution operation or an enclave removal operation.

Next, at step 314, the VMX module 220-i requests the enclave operation contained in the enclave command from the TEE backend module 234. In an embodiment, this request is made using a system call. Next, at step 316, in response to the enclave operation requests, the TEE backend module 234 interacts with the hardware TEE mechanism 212 in the computer system 200 to instruct the hardware TEE mechanism to execute the enclave operation. In an embodiment, the interactions between the TEE backend module 234 and the hardware TEE mechanism 212 may involve the TEE backend module generating and transmitting one or more appropriate enclave commands to the hardware TEE mechanism in accordance with a particular API, which is specific to that hardware TEE mechanism.

Next, at step 318, the hardware TEE mechanism 212 executes the enclave operation as a result of the interactions with the TEE backend module 234. Next, at optional step 320, after the enclave operation has completed, the TEE backend module 234 sends a request to the virtual SE device 226 to mark the enclave command in the command queue 236 of the virtual SE device 226 as being completed.

Figure 4:
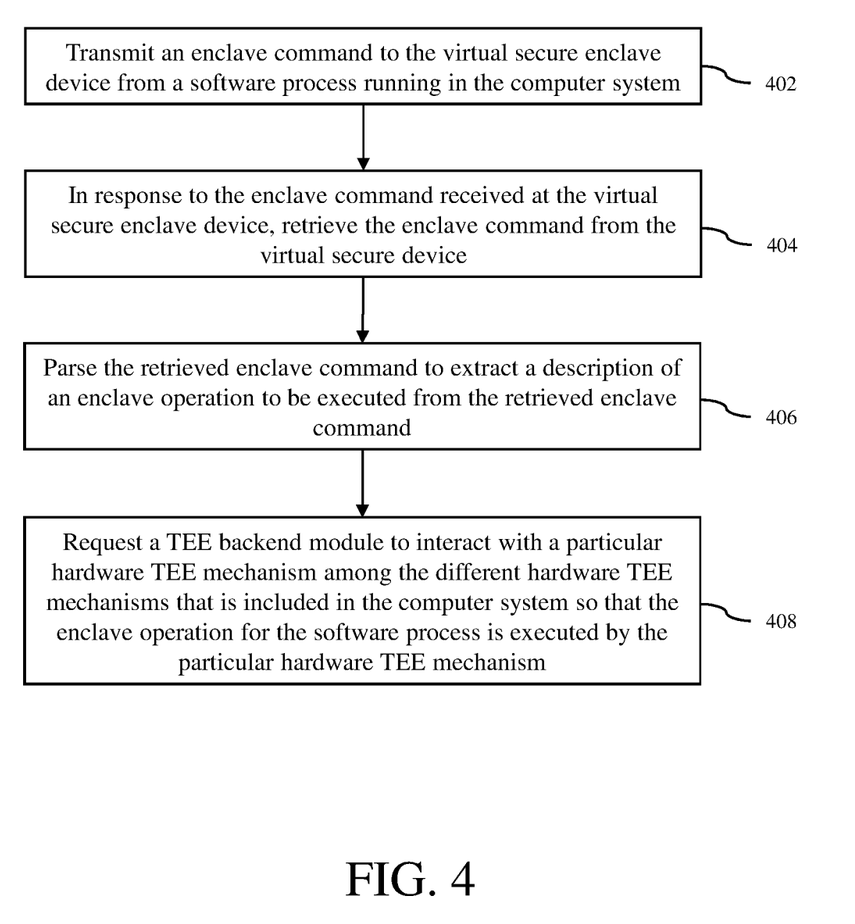
FIG. 4 is a flow diagram of a method for managing TEEs of different hardware TEE mechanisms using a virtual secure enclave device running in a virtualized environment in a computer system in accordance with an embodiment of the invention.

A computer-implemented method for creating and managing trusted execution environments (TEEs) based on different hardware TEE mechanisms using a virtual secure enclave device running in a virtualized environment in a computer system in accordance with an embodiment of the invention is described with reference to a flow diagram of FIG. 4. At block 402, an enclave command is transmitted to the virtual secure enclave device from a software process running in the computer system. At block 404, in response to the enclave command received at the virtual secure enclave device, the enclave command is retrieved from the virtual secure device. At block 406, the retrieved enclave command is parsed to extract a description of an enclave operation to be executed from the retrieved enclave command. At block 408, a TEE backend module is requested to interact with a particular hardware TEE mechanism among the different hardware TEE mechanisms that is included in the computer system so that the enclave operation for the software process is executed by the particular hardware TEE mechanism.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for creating and managing trusted execution environments (TEEs) based on different hardware TEE mechanisms using a virtual secure enclave device running in a virtualized environment in a computer system, the method comprising:

transmitting an enclave command using a universal application programming interface (API) to the virtual secure enclave device from a software process running in the computer system, including inserting the enclave command into a command queue in the virtual secure enclave device;

in response to the enclave command received at the virtual secure enclave device, retrieving the enclave command from the virtual secure device, including emulating the command queue in the virtual secure enclave device to retrieve the enclave command in the command queue of the virtual secure enclave device;

parsing the retrieved enclave command to extract a description of an enclave operation to be executed from the retrieved enclave command;

requesting a TEE backend module to interact with a particular hardware TEE mechanism among the different hardware TEE mechanisms that is included in the computer system so that the enclave operation for the software process is executed by the particular hardware TEE mechanism, wherein the TEE backend module is configured to interact with each of the different hardware TEE mechanisms using commands specific to each of the different hardware TEE mechanisms; and translating the retrieved enclave command from the universal API to a particular API selected from a plurality of APIs depending on the particular hardware TEE mechanism in the computer system so that the enclave operation for the software process is executed by the particular hardware TEE mechanism.

2. The method of claim 1, wherein transmitting an enclave command to the virtual secure enclave device includes communicating with the virtual secure enclave device through a device driver for the virtual secure enclave device, wherein communications between the device driver and the virtual secure enclave device are executed using the universal application programming interface regardless of which of the different hardware TEE mechanisms is included in the computer system.

3. The method of claim 2, wherein communications between the TEE backend module and the particular hardware TEE mechanism in the computer system are executed using the particular application programming interface specific to the particular hardware TEE mechanism.

4. The method of claim 1, wherein retrieving the enclave command from the virtual secure enclave device includes trapping an operation of inserting the enclave command into the command queue in the virtual secure enclave device.

5. The method of claim 4, wherein trapping an operation of inserting the enclave command into the command queue is performed by a virtual machine monitor (VMM) running in a VMkernel in the virtualized environment.

6. The method of claim 1, wherein the virtual secure enclave device is running in a hypervisor to receive and insert the enclave command into the command queue in the hypervisor, and wherein emulating the command queue is performed by a virtual machine executable (VMX) module running in the hypervisor.

7. A non-transitory computer-readable storage medium containing program instructions for creating and managing trusted execution environments (TEEs) based on different hardware TEE mechanisms using a virtual secure enclave device running in a virtualized environment in a computer system, wherein execution of the program instructions by one or more processors of the computer system causes the one or more processors to perform steps comprising:
- transmitting an enclave command using a universal application programming interface (API) to the virtual secure enclave device from a software process running in the computer system, including inserting the enclave command into a command queue in the virtual secure enclave device;
- in response to the enclave command received at the virtual secure enclave device, retrieving the enclave command from the virtual secure device;
- parsing the retrieved enclave command to extract a description of an enclave operation to be executed from the retrieved enclave command, including emulating the command queue in the virtual secure enclave device to retrieve the enclave command in the command queue of the virtual secure enclave device;
- requesting a TEE backend module to interact with a particular hardware TEE mechanism among the different hardware TEE mechanisms that is included in the computer system so that the enclave operation for the software process is executed by the particular hardware TEE mechanism, wherein the TEE backend module is configured to interact with each of the different hardware TEE mechanisms using commands specific to each of the different hardware TEE mechanisms; and
- translating the retrieved enclave command from the universal API to a particular API selected from a plurality of APIs depending on the particular hardware TEE mechanism in the computer system so that the enclave operation for the software process is executed by the particular hardware TEE mechanism.

8. The computer-readable storage medium of claim 7, wherein transmitting an enclave command to the virtual secure enclave device includes communicating with the virtual secure enclave device through a device driver for the virtual secure enclave device, wherein communications between the device driver and the virtual secure enclave device are executed using the universal application programming interface regardless of which of the different hardware TEE mechanisms is included in the computer system.

9. The computer-readable storage medium of claim 8, wherein communications between the TEE backend module and the particular hardware TEE mechanism in the computer system are executed using the particular application programming interface specific to the particular hardware TEE mechanism.

10. The computer-readable storage medium of claim 7, wherein retrieving the enclave command from the virtual secure enclave device includes trapping an operation of inserting the enclave command into the command queue in the virtual secure enclave device.

11. The computer-readable storage medium of claim 10, wherein trapping an operation of inserting the enclave command into the command queue is performed by a virtual machine monitor (VMM) running in a VMkernel in the virtualized environment.

12. The computer-readable storage medium of claim 7, wherein the virtual secure enclave device is running in a hypervisor to receive and insert the enclave command into the command queue in the hypervisor, and wherein emulating the command queue is performed by a virtual machine executable (VMX) module running in the hypervisor.

13. A computer system comprising:
- memory; and
- at least one processor configured to:
  - transmit an enclave command using a universal application programming interface (API) to a virtual secure enclave device running in a virtualized environment in the computer system from a software process running in the computer system, including inserting the enclave command into a command queue in the virtual secure enclave device;
  - in response to the enclave command received at the virtual secure enclave device, retrieve the enclave command from the virtual secure device, including emulating the command queue in the virtual secure enclave device to retrieve the enclave command in the command queue of the virtual secure enclave device;
  - parse the retrieved enclave command to extract a description of an enclave operation to be executed from the retrieved enclave command;
  - request a TEE backend module to interact with a particular hardware TEE mechanism among different hardware TEE mechanisms that is included in the computer system so that the enclave operation for the software process is executed by the particular hardware TEE mechanism, wherein the TEE backend module is configured to interact with each of the different hardware TEE mechanisms using commands specific to each of the different hardware TEE mechanisms; and
  - translate the retrieved enclave command from the universal API to a particular API selected from a plurality of APIs depending on the particular hardware TEE mechanism in the computer system so that the enclave operation for the software process is executed by the particular hardware TEE mechanism.

14. The computer system of claim 13, wherein the software process communicates with the virtual secure enclave device through a device driver for the virtual secure enclave device using the universal application programming interface regardless of which of the different hardware TEE mechanisms is included in the computer system.

15. The computer system of claim 14, the TEE backend module communicates with the particular hardware TEE mechanism in the computer system using the particular application programming interface specific to the particular hardware TEE mechanism.

16. The computer system of claim 13, wherein the virtual secure enclave device is running in a hypervisor to receive and insert the enclave command into the command queue in the hypervisor, and wherein emulating the command queue is emulated by a virtual machine executable (VMX) module running in the hypervisor.

* * * * *